July 26, 1960

E. POLZINETTI 2,946,627

CONVEYING APPARATUS FOR POWDERED CEMENT

Filed March 24, 1958

INVENTOR
Emilio Polzinetti
by
Richardson, David & Nordon
His Attorneys

July 26, 1960  E. POLZINETTI  2,946,627
CONVEYING APPARATUS FOR POWDERED CEMENT
Filed March 24, 1958  2 Sheets-Sheet 2

INVENTOR
Emilio Polzinetti
By
Richardson, David & Norden
His Attorneys

2,946,627

CONVEYING APPARATUS FOR POWDERED CEMENT

Emilio Polzinetti, Florence, Italy, assignor of one-half to Cementi Elba Societa per Azione (C.E.S.A.), Florence, Italy, a corporation of Italy Filed Mar. 24, 1958, Ser. No. 723,481

Claims priority, application Italy Mar. 25, 1957

1 Claim. (Cl. 302—23)

Transfer and conveying pneumatic systems for loose ground cement are presently used. These systems provide for an entraining of the cement powder—or the like—within air pressurized conduits, and therefore it is necessary that at least the cavity from which the cement is to be picked up must be an airtight cavity and resistant to internal pressures. Systems of this kind show considerable disadvantages, particularly because a vehicle and still more a watercraft, which is equipped for such transportation, must be provided with watertight and pressure-resistant cavities, which prevents their use for other purposes. In fact, lorries for loose cement transport generally involve large pressure-resistant tanks. In general watercraft are not used at all because said craft would have to be particularly equipped for this purpose.

A pneumatic intake system has been adopted and used for some time, for the transport of loose substances from watercraft to port installations, as, for instance, for the unloading of wheat and the like from watercraft. This system allows the lifting of such materials up to remarkable heights. Such systems cannot be generally adopted for cement, as the cement cannot reach a head or height practically sufficient for the purpose. Therefore it is necessary to use other systems. The present invention relates to a system for the pneumatic transport of loose ground cement or the like and it essentially consists in determining a pneumatic intake of the cement from the mass; its separation from the air draft and its input into a mechanical feed device which discharges said cement into a pressurized air draught for the remainder of the pneumatic transport path.

In practice, the apparatus involves—according to the invention—pneumatic intake means acting on a loose pick-up conduit or piping with the insertion of filtering means between said conduit and said intake means, a mechanical apparatus to receive the intaken and separated cement, coming from the intake draught, and to unload it into intermittent dosing means which lead it into a pneumatic transport conduit, wherein an air-pressurized draught is provided.

The dosing or proportioning means or other equivalent means are actuated so as to prevent the pressurized air from reaching the de-pressurized conduit, which determines the intake.

The mechanical apparatus may involve an unloading hopper from the filter towards a screw-conveyor or feeder or the like, which discharges the cement into the dosing or proportioning unit.

In an embodiment adapted to the unloading of watercraft, a mechanical apparatus of this kind may be provided in the ports' equipment or installations, or on the craft itself, arranging a loose intake conduit or piping and a delivery conduit, which may be partly flexible if the equipment is located on board the craft.

The invention will be better appreciated by following the description and the accompanying drawings which illustrate an embodiment of the invention. In said drawing.

Figure 1:
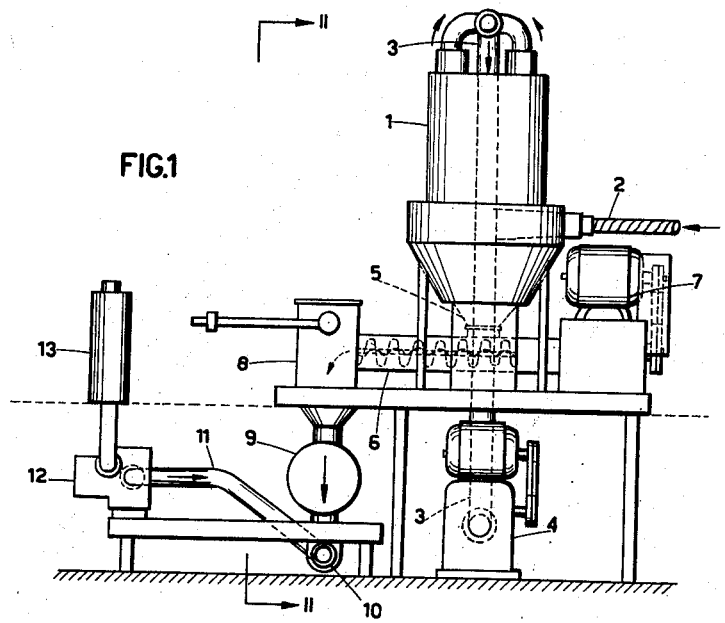
Fig. 1 is a side elevational view of an embodiment of the invention.

According to what is illustrated in the drawing, 1 denotes the main casing of a filter separator wherein an intake draught is introduced through the conduit 2. The conduit 2 is a flexible pipe whose other end is inserted into the cavity, however formed, where the cement is located. In the filter chamber 1, the powdered cement conveyed by the intake air draught is separated from said draught, which then goes into a conduit 3 until it reaches an intake unit 4.

The cement retained by the filtering walls of the filter 1 is forwarded through a hopper 5 into an unloading chamber 6 involving a conveyor worm, driven for instance by a motor 7. The conveyor 6 transfers the cement gradually piled up in the hopper 5 towards a closed chamber 8 from which the cement, which may dwell therein and pile up, is passed into a dosing device 9. This dosing device 9 may be any suitable type which is capable of delivering predetermined quantities of loose material (in the particular case cement) from the chamber 8 towards another use, without the dosing device 9 being in communication upstream, that is towards the chamber 8. According to the illustrated arrangement, the dosing device 9 cyclically discharges the material through a coupling member 10 communicating with a lateral opening in a discharge pipe 11. Pipe 11 is connected to an air compressor unit 12, which receives air from a filter 13 and forces it into the pipe 11. Therefore predetermined doses of cement are transferred from the chamber 8, which collects powdered material delivered from hopper 5 by conveyor 6. The dosing device 9 prevents the transmission of pressurized air from the conduit 11 to the chamber 8. Furthermore conveyor 6 which has a helical multiple turn rotor effectively maintains hermetic separation of the vacuum in chamber 1 and the high pressure in pipe 11 while freely passing the powdered material along from hopper 5 to collecting chamber 8.

Figure 2:
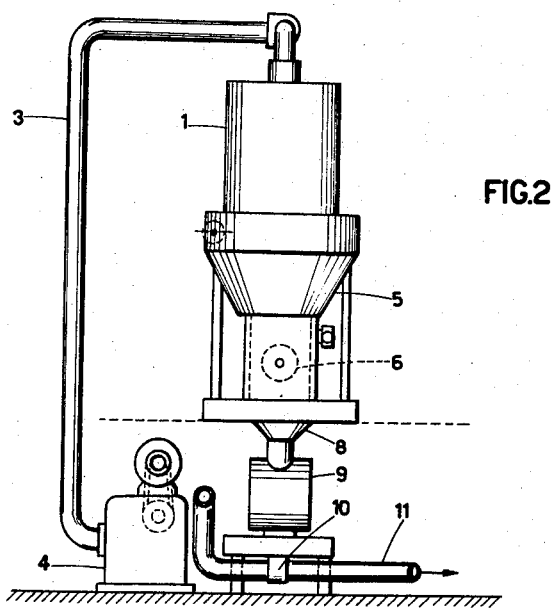
Fig. 2 is a fragmentary sectional view taken along line II—II of Fig. 1.

According to the scheme of Figs. 1 and 2 which may be adapted to a stationary plant, the conduit 11 directly reaches the preservation or storage silos and very high heads may be obtained through the pressurized air draught.

Figure 3:
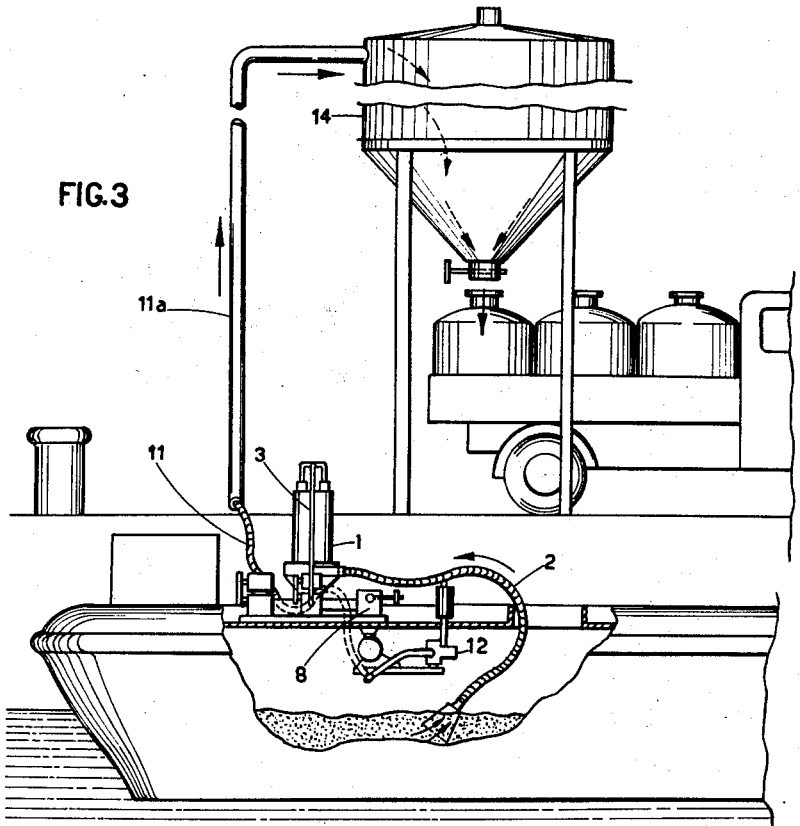
Fig. 3 is an exploded fragmentary side elevational view, partly broken away, of the apparatus of the present invention mounted in a ship or watercraft.
Figure 4:
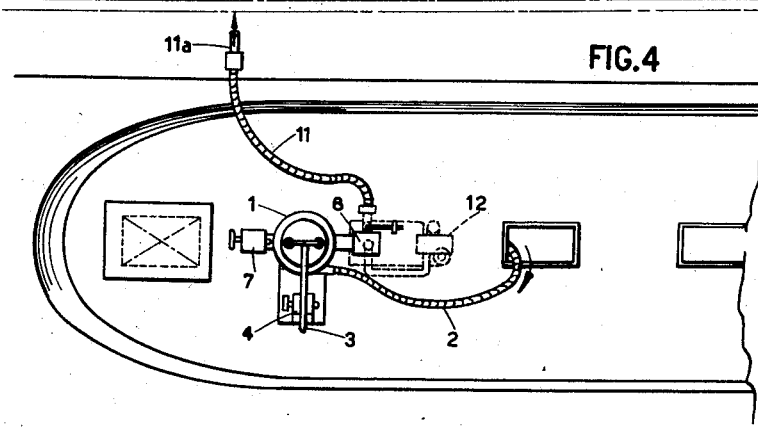
Fig. 4 is a plan view of Fig. 3.

According to the arrangement of Figs. 3 and 4, on the contrary, the conduit 11 continues on as a flexible piping from a watercraft where the whole plant is located. The flexible conduit or piping 11 then continues in the stationary plant with a portion of the conduit 11a which communicates with the upper portions of silos 14.

Whichever the arrangement, it is apparent that the plant according to the invention allows the picking up of the loose material of the cement type from any tank which has no need of being pressurized. In fact the transport of the material is partly effected by vacuum and partly by pressure. In this way, it is also possible to force the cement (or any material having the same behavior) to high transport differences of levels, which can not be obtained with a simple apparatus operating by partial vacuum means alone, said levels instead being obtainable with depressurized apparatus in the pneumatic pick up, for instance, of wheat and the like.

According to the equipment available, it may be advantageous to locate the apparatus of the present invention on a transport craft or in a zone provided with stationary equipment where it is required to discharge the cement from watercraft or vehicle. Although in Figs. 3 and 4 there has been provided an embodiment and application of the invention to a watercraft, it is apparent that an apparatus of this kind may also be suited to various types of land transport vehicles, on road or railway type. These vehicles therefore have no need of being provided with cavities which cannot be used for other purposes in the return journeys. Therefore the conventional service watercraft may be used with the present apparatus without any transformations thereof and without the use of containers or casings of any kind.

The emptying operations are particularly fast.

It is intended that the drawings show only certain embodiments, given only as a practical demonstration of the invention, and said invention being such as may be varied in the form and arrangement of parts without however departing from the scope of the concept of said invention.

What I claim is:

A powdered material conveyor system comprising: a filter chamber for separating powdered material from an air stream; a vacuum pump connected to said filter chamber to maintain a suction therein; a flexible intake pipe having one end connected to said filter chamber and the other end thereof free for insertion into a mass of said powdered material for drawing said material in an air stream by suction into said chamber; a hopper receiving said powdered material from said filter chamber; a closed chamber for collecting said powdered material; a worm conveyor interconnecting said hopper and said closed chamber for moving said powdered material from the hopper to said closed chamber; an air compressor having a filtered air intake; a discharge pipe connected to said compressor, said pipe having a lateral opening; a dosing device connected between said closed chamber and said lateral opening for cyclically discharging quantities of said powdered material into said pipe; said compressor maintaining high air pressure in said pipe to move powdered material discharged into the pipe along to an outlet; said worm conveyor including a multiple turn helical rotor effective to hermetically separate said hopper from said closed chamber, so that the high air pressure in said pipe is isolated from the suction in said filter chamber.

References Cited in the file of this patent

UNITED STATES PATENTS

| | | |
|---|---|---|
| 1,231,778 | Nall | July 3, 1917 |
| 2,347,271 | Linn | Apr. 25, 1944 |
| 2,686,084 | Baldwin | Aug. 10, 1954 |

FOREIGN PATENTS

| | | |
|---|---|---|
| 1,015,881 | France | Aug. 13, 1952 |